United States Patent
Konoplev

(10) Patent No.: US 10,062,216 B2
(45) Date of Patent: Aug. 28, 2018

(54) APPLYING FACIAL MASKS TO FACES IN LIVE VIDEO

(71) Applicant: Aleksey Konoplev, St. Petersburg (RU)

(72) Inventor: Aleksey Konoplev, St. Petersburg (RU)

( * ) Notice: Subject to any disclaimer, the term of this patent is extended or adjusted under 35 U.S.C. 154(b) by 0 days.

(21) Appl. No.: 15/264,278

(22) Filed: Sep. 13, 2016

(65) Prior Publication Data

US 2018/0075665 A1    Mar. 15, 2018

(51) Int. Cl.

| | | |
|---|---|---|
| *G06T 19/00* | (2011.01) | |
| *G06T 3/00* | (2006.01) | |
| *G06T 5/00* | (2006.01) | |
| *G06T 5/20* | (2006.01) | |
| *G06T 7/246* | (2017.01) | |
| *G06T 3/60* | (2006.01) | |
| *G06T 13/40* | (2011.01) | |
| *G06T 19/20* | (2011.01) | |
| *G06T 7/20* | (2017.01) | |

(52) U.S. Cl.
CPC ............ *G06T 19/20* (2013.01); *G06T 3/0093* (2013.01); *G06T 3/606* (2013.01); *G06T 5/002* (2013.01); *G06T 5/20* (2013.01); *G06T 7/2046* (2013.01); *G06T 13/40* (2013.01); *G06T 2207/10016* (2013.01); *G06T 2207/20028* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2007/0189627 A1* | 8/2007 | Cohen | ............... | G06K 9/00228 382/254 |
| 2009/0202114 A1* | 8/2009 | Morin | ..................... | A63F 13/12 382/118 |
| 2013/0315554 A1* | 11/2013 | Ybanez Zepeda | ........ | G06T 7/20 386/201 |
| 2015/0205997 A1* | 7/2015 | Ma | ..................... | G06K 9/00281 382/118 |
| 2015/0286858 A1* | 10/2015 | Shaburov | ............. | G06K 9/6209 382/103 |
| 2016/0241884 A1* | 8/2016 | Messing | ................ | H04N 19/85 |
| 2017/0278302 A1* | 9/2017 | Varanasi | ................ | G06T 17/20 |

OTHER PUBLICATIONS

Gudmandsen, Magnus. "Using a robot head with a 3D face mask as a communication medium for telepresence." (2015).*

* cited by examiner

*Primary Examiner* — Maurice L McDowell, Jr.
*Assistant Examiner* — Donna J Ricks
(74) *Attorney, Agent, or Firm* — Dodd Call Black, PLLC; Dustin Call

(57) ABSTRACT

A method for applying facial masks to faces in live video. The method includes receiving an image containing a face from a user, wherein the image is a frame of a video and identifying the coordinates of a face in the image. The method also includes identifying the coordinates of facial elements within the face previously identified and synchronizing a bitmap add-on, wherein synchronizing the bitmap add-on includes aligning the bitmap add-on with the identified facial elements. The method further includes applying the bitmap add-ons over the frame of the identified face.

18 Claims, 9 Drawing Sheets

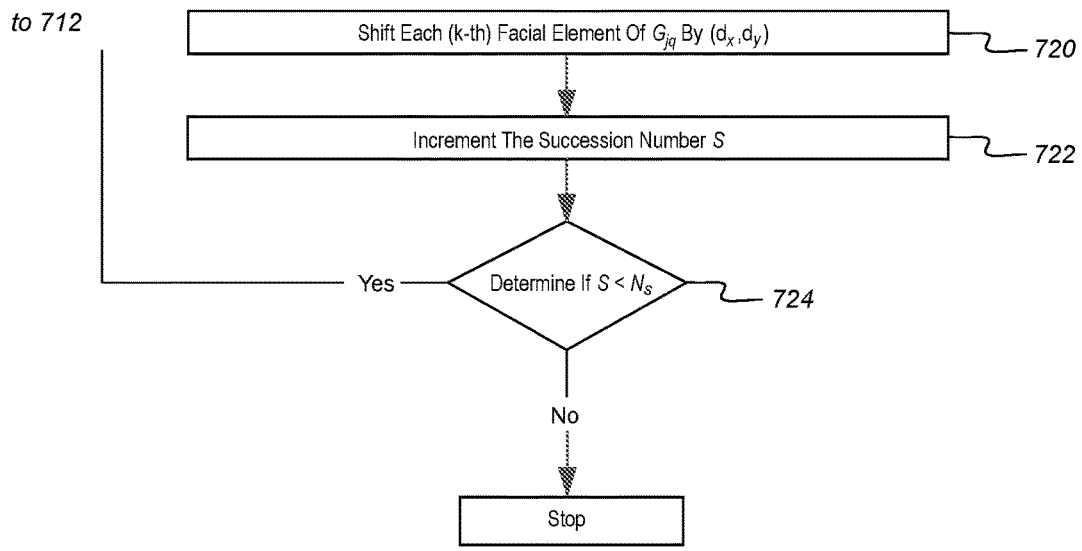
FIG. 7 (cont')

APPLYING FACIAL MASKS TO FACES IN LIVE VIDEO

CROSS-REFERENCE TO RELATED APPLICATIONS

Not applicable.

BACKGROUND OF THE INVENTION

Applying a facial mask to a face in a video is very different from applying a facial mask to a face in an image. In particular, an image is stationary; therefore, once the image and the facial mask are properly aligned with one another the facial mask can be placed in front of the face (or blended with the face to make the mask semi-transparent). However, in a video the face and many facial elements are in motion, making the addition of a facial mask a particularly difficult problem (background, for example, is easy to replace since it can be filmed as a stationary element such as a green screen). For example, the placement of the face, expressions on the face, the angle of the face relative to the camera, etc. may all change from frame to frame. Even if the user tries to hold still there are movements that are impossible to suppress for long periods of time, such as blinking or iris movement.

Because of this difficulty facial masks are generally applied on a frame by frame basis. Further, it is difficult to fully automate this process. For example, in one frame the whole facial mask may move during an automated process relative to the face because of movements of part of the face, such as a jaw when the actor is talking. Therefore, this process is accomplished by hiring a specialist that adds the facial mask to each frame. This allows them to control elements such as those discussed above that would cause the mask to move and would cause a disorienting effect.

Since these changes are made in a very time intensive process it is impossible to make the changes in real-time. I.e., the process can sometimes be finished weeks or months after the video is actually recorded.

Accordingly, there is a need in the art for a method that can apply facial masks to a face in real-time. Further, there is a need for the method to apply the facial mask in a manner that allows the facial mask to respond to facial movements of the user.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for applying facial masks to faces in live video. The method includes receiving an image containing a face from a user, wherein the image is a frame of a video and identifying the coordinates of a face in the image. The method also includes identifying the coordinates of facial elements within the face previously identified and synchronizing a bitmap add-on, wherein synchronizing the bitmap add-on includes aligning the bitmap add-on with the identified facial elements. The method further includes applying the bitmap add-ons over the frame of the identified face.

Another example embodiment includes a method for applying facial masks to faces in live video. The method includes receiving an image containing a face from a user, wherein the image is a frame of a video and identifying the coordinates of a face in the image. The method also includes identifying the coordinates of facial elements within the face previously identified and synchronizing a bitmap add-on, wherein synchronizing the bitmap add-on includes aligning the bitmap add-on with the identified facial elements. The method for synchronizing the bitmap add-on includes smoothing facial element coordinates in the current frame based on previous frames, warping the face in the image and warping the bitmap add-on. The method further includes applying the bitmap add-ons over the frame of the identified face.

Another example embodiment includes a method for applying facial masks to faces in live video. The method includes receiving an image containing a face from a user, wherein the image is a frame of a video and identifying the coordinates of a face in the image. The method also includes identifying the coordinates of facial elements within the face previously identified and training a detector, wherein training a detector allows for synchronization of a bitmap add-on. The method also includes synchronizing a bitmap add-on, wherein synchronizing the bitmap add-on includes aligning the bitmap add-on with the identified facial elements. The method for synchronizing the bitmap add-on includes smoothing facial element coordinates in the current frame based on previous frames, warping the face in the image and warping the bitmap add-on. The method additionally includes applying the bitmap add-ons over the frame of the identified face.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 6 is a flowchart illustrating a method of synchronizing the bitmap add-on;

DETAILED DESCRIPTION OF SOME EXAMPLE EMBODIMENTS

Reference will now be made to the figures wherein like structures will be provided with like reference designations.

It is understood that the figures are diagrammatic and schematic representations of some embodiments of the invention, and are not limiting of the present invention, nor are they necessarily drawn to scale.

Figure 1:
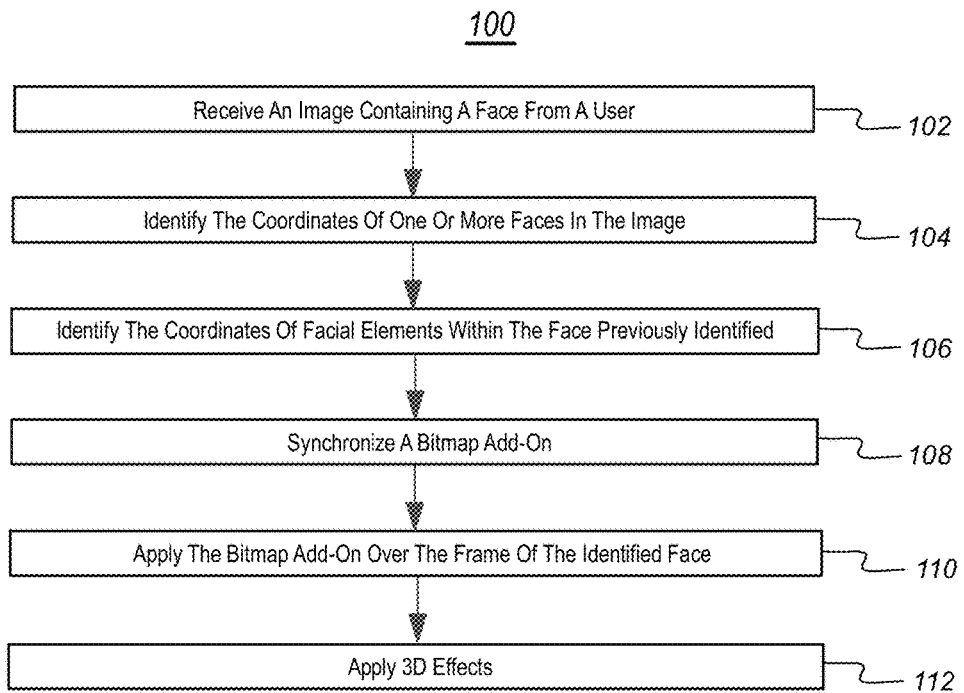
FIG. 1 is a flowchart illustrating an example of a method for applying facial masks to faces in live video.

FIG. 1 is a flowchart illustrating an example of a method 100 for applying facial masks to faces in live video. The method 100 works in real time, receiving a frame from a video camera (such as a webcam or a smartphone camera) and processing it, applying various effects and displaying to the user. Alternatively, the method 100 can process a video offline, receiving each frame from a file and storing the processed frame to a modified video file. As a still image is a special case of a video (containing just 1 frame), one of skill in the art will appreciate that the method is applicable to still images as well. So without loss of generality we discuss how to use the method with videos.

For example, we can have a face of a character and put it over a user's face, so that its facial elements (e.g., eyes, mouth, nose, eyebrows, etc.) are aligned with the users' facial elements. Additionally or alternatively, we can place features like wrinkles or facial paint over the user's face. In such case the character's face or wrinkles which are placed over the user's face is called a "bitmap add-on". One of skill in the art will appreciate that the video may include more than one face and that the method 100 is applicable to any number of faces within the video without restriction. For example, a first character's face can be placed over the face of a first user and a second character's face can be placed over the face of a second user.

FIG. 1 shows that the method 100 can include receiving 102 an image containing a face from a user. As noted above, the image can be received 102 as part of a video or other sequence of images. The image can include a face either from a frontal view or from some offset angle, as described below. The image can be received using any desired method. For example, the image can be uploaded using a webpage, application, mobile phone app, file sharing network or any other desired upload method. The image or associated video file can be prerecorded or can be provided in real-time as recorded by the user. Additionally or alternatively, the image can be saved to a particular location or otherwise be provided by the user.

FIG. 1 also shows that the method 100 can include identifying 104 the coordinates of one or more faces in the image. I.e., the region of the image which contains a face can be identified 104. To find a region containing the face any desired algorithm can be used. I.e., the algorithm can identify the face within the image, then select a region around the face and include everything within the region as the user's face. For example, a rectangle that encloses the face can be identified from the user supplied image. See, for example, Viola-Jones algorithm, P. Viola, M. Jones, *Robust real-time object detection*, Technical Report CRL 20001/01, Cambridge Research Laboratory, 2001 (which is incorporated by reference herein in its entirety).

Figure 2:
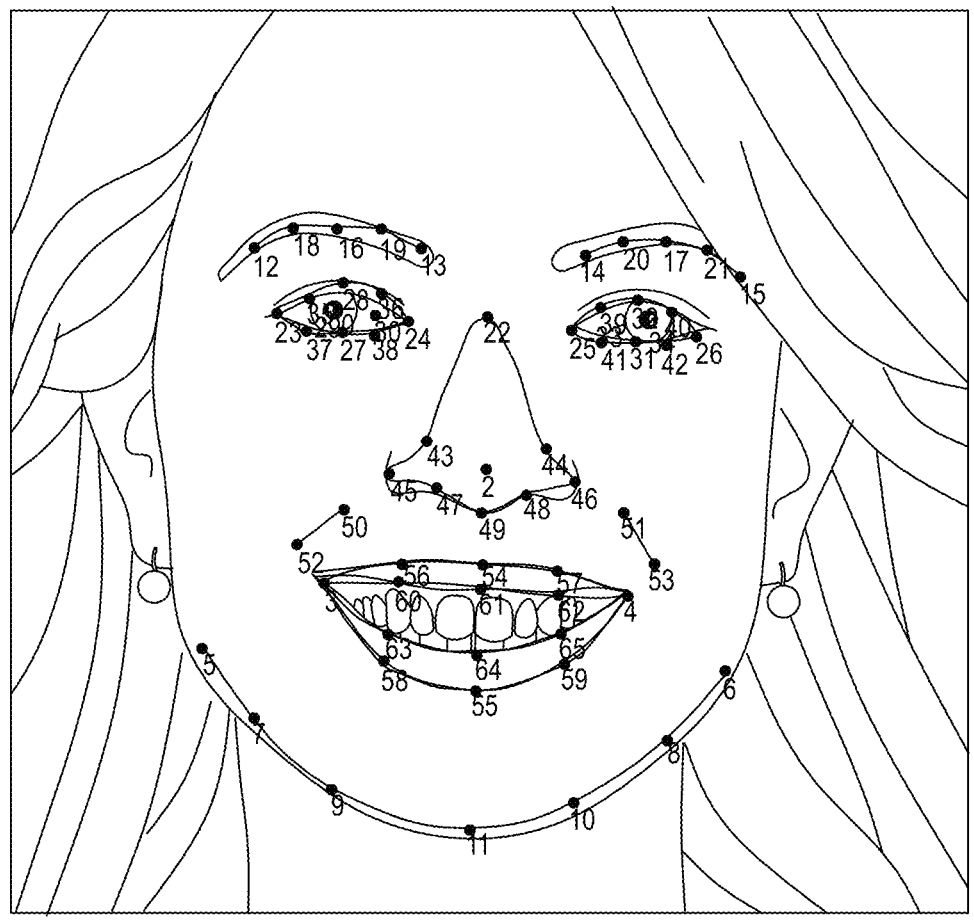
FIG. 2 is an illustration of identified facial features.

FIG. 1 further shows that the method 100 can include identifying 106 the coordinates of facial elements within the face previously identified 104. To identify the coordinates of facial elements, any known method for facial element detection can be used. For example, U.S. patent application Ser. No. 13/328,523 filed on Dec. 16, 2011, entitled "SYSTEM AND METHOD FOR AUTOMATIC DETECTION AND RECOGNITION OF FACIAL FEATURES", which application is incorporated herein by reference in its entirety, discloses one such method. E.g., the incorporated method detects the coordinates of 66 facial features (such as pupils, eye corners, mouth corners, lips, nose, eyebrows, etc.) one example embodiment of which is shown in FIG. 2. The number of detected facial features can be represented as N (e.g., 66 in the example above; one of skill in the art will appreciate that more or fewer elements may be used as needed—e.g., at the contour of the face, near the ears, at the forehead, etc., thus making N larger or smaller than 66), and the coordinates of detected facial features as $f_k \in R^2$, $k=0, \ldots, N-1$ f, $f_k \in R^2$, $k \in 0, \ldots, N-1$. The vector f containing N facial elements is referenced to as a grid.

Alternatively, the coordinates of facial elements can be identified 106 using a "successive steps" method to identify the coordinates of facial elements. One example of this method is disclosed below.

FIG. 1 additionally shows that the method 100 can include synchronizing 108 a bitmap add-on. Synchronizing 108 the bitmap add-on allows the identified face and the bitmap add-on to be conformed to one another. I.e., synchronizing 108 the bitmap add-on allows the bitmap add-on to be placed in a way that is pleasant to the eye and not disorienting. For example, consider three points, the interior point of both eyes and the tip of the nose, on both a character's face and the identified face. These three points can be depicted as a triangle in two dimensions. Any one side of the triangle in the character's face can be easily made to be the same size as the corresponding side of the triangle in the identified face; however, this does not necessarily make the other two sides equidistant because the angles can be different. Therefore, either the character's face or the detected face or both must be modified to ensure that the angles and distances match one another, not only over three points but over every identified coordinate. Thus, the bitmap add-on and/or the identified face are warped to match one another.

One of skill in the art will appreciate that synchronizing 108 the bitmap add-on can be done in a number of ways. For example, there is third-party software which is capable of producing the desired result. Therefore, one or more software package can be used with the results compared to determine which solution creates the best effect. Additionally or alternatively, a method of synchronizing 108 the bitmap add-on which may be used is disclosed below.

FIG. 1 moreover shows that the method 100 can include applying 110 the bitmap add-on over the frame of the (possibly warped) identified 106 face. I.e., now that the bitmap add-on has and identified face are harmonized with one another, the bitmap add-on can be overlaid relative to the identified face. That is, we blend the values of each pixel of the warped bitmap add-on with those of the warped facial image. We may account for the transparency of some pixels, which is called alpha blending and is described in U.S. patent application Ser. No. 13/624,596 filed on Sep. 21, 2012, entitled "METHOD OF CREATING AVATAR FROM USER SUBMITTED IMAGE", which application is incorporated herein by reference in its entirety. The bitmap add-on may possibly contain several parts, such that each part is applied with its own blending method. For example, instead of taking a weighted sum of pixel values as in alpha blending, we may instead multiply the pixel values. Further, some parts of the bitmap add-on may not undergo warping, but only be shifted to account for the position of some facial elements. For example, when applying a bitmap add-on that contain something rigid such as glasses, it is usually more aesthetically pleasing not to warp them (i.e. not to change their form), but only to shift them. These effects can be subtle or substantial, but the result is the same, a face that has the bitmap add-on integrated as a portion or the entirety of the user's face.

FIG. 1 also shows that the method 100 can include applying 112 3D effects. One may also determine the 3D pose of the face (which may include the 3D rotation angle, 3D position and size of the face) based on the 2D position of its facial elements. For example, one may use the POSIT algorithm ("Model Based Object Pose in 25 Lines of Code", Daniel F. DeMenthon and Larry S. Davis, International Journal of Computer Vision, 1995, vol. 15, pp. 123-141), incorporated herein by reference in its entirety, or any other suitable algorithm. Then, one may render other predefined 3D models over the facial image, based on the 3D pose of the face. For example, these 3D models could be rotated at the same angle and have the same overall 3D position. They could also be shifted to have the position of certain facial elements. For example, we can have a 3D model of a hat that has the same 3D rotation angle as face, and is rendered at the forehead (thus, it will rotate as the user rotates its head). Alternatively, we can have a 3D model of eyeglasses and render it at the eyes of the user, so the overall impression will be that the user wears eyeglasses. We can also have a 3D model of a long nose and render it near the facial elements of the nose, or a 3D model of a beard, or a 3D model of eyelashes, or a different hairstyle, accessories, and so on. One may also animate the 3D model.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
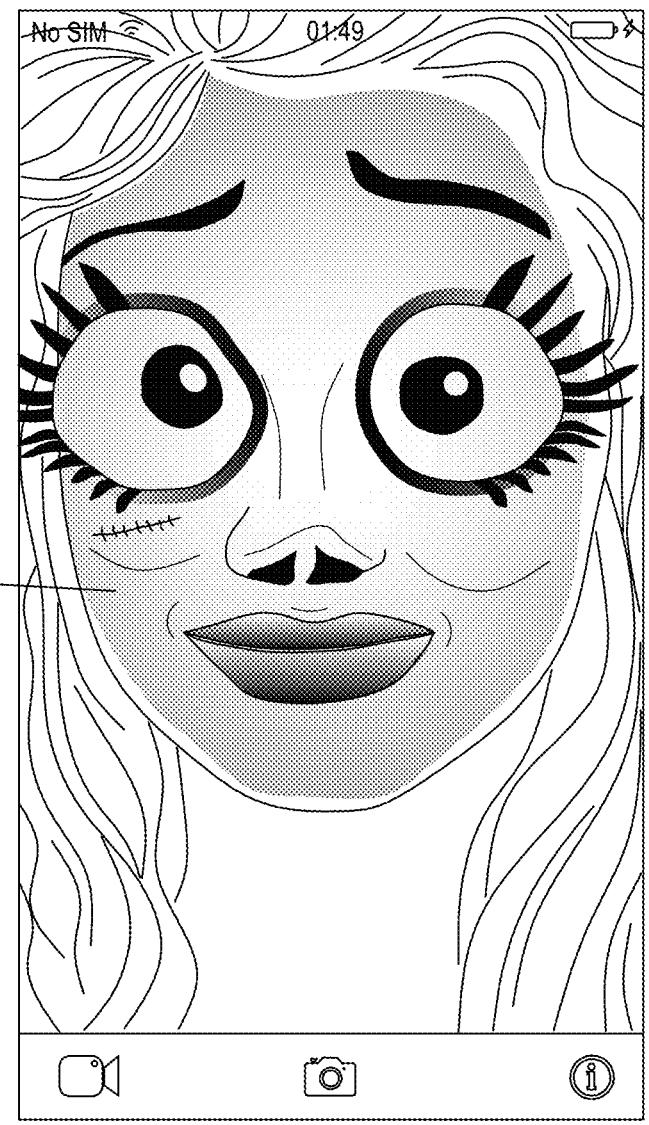
FIG. 3 illustrates an example of an image with a facial mask applied to a face in a video.

FIG. 3 illustrates an example of an image 300 with a facial mask 302 applied to a face in a video. I.e., the face of the user has been overlaid with a character's face. During the filming of the video, the detected face has been replaced with the character's face. Thus, the final product of the video includes the facial mask 302 as if it had been present originally and not added dynamically during recording (although one of skill in the art will understand that the video without the character's face can also be provided).

Figure 4:
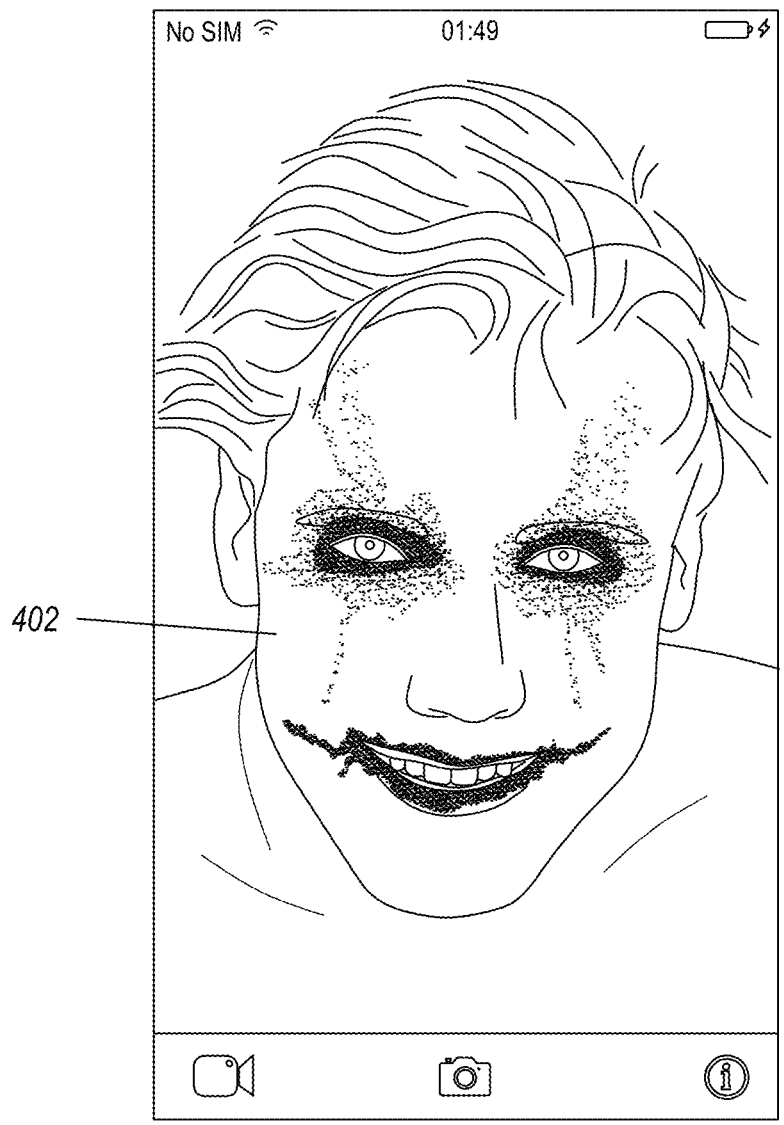
FIG. 4 illustrates an alternative example of an image with a facial mask.

FIG. 4 illustrates an alternative example of an image 400 with a facial mask 402. The facial mask 402 is semi-transparent. I.e., features of the face identified from the received image are visible through the facial mask 402. This is due to the alpha blending of the face and the facial mask 402. Thus, subtle effects can be added as the facial mask 402.

Figure 5:
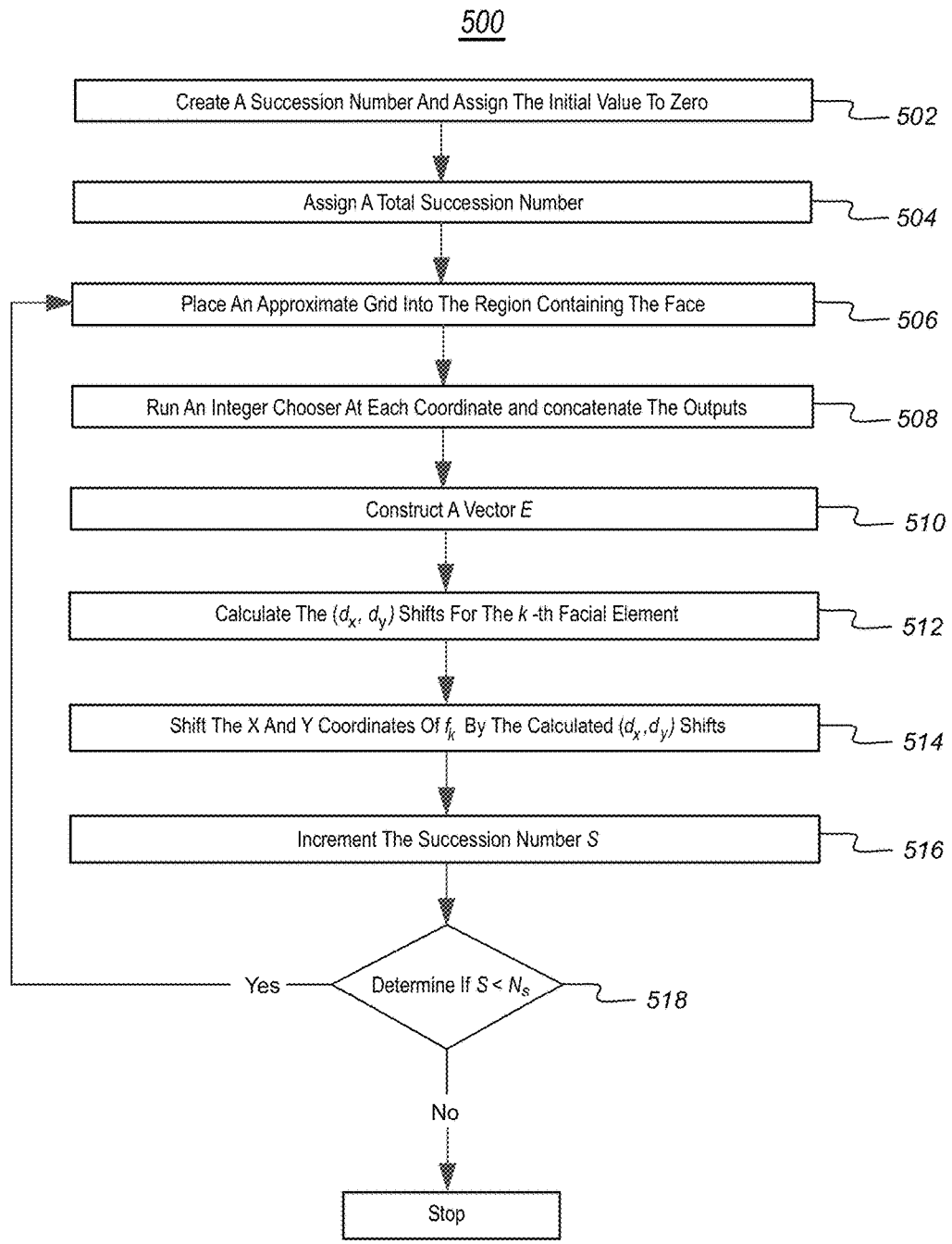
FIG. 5 is a flowchart illustrating a method for identifying the coordinates of facial elements.

FIG. 5 is a flowchart illustrating a method 500 for identifying the coordinates of facial elements. The method 500 automatically detects the facial elements and assigns coordinates to the elements.

FIG. 5 shows that the method 500 can include creating 502 a succession number and assigning the initial value to zero. The succession number is a counter that allows the number of successions that have occurred. I.e., the succession number keeps track of how many times the method 500 has been implemented.

FIG. 5 moreover shows that the method 500 can include assigning 504 a total succession number $N_S$. The total succession umber is the number of times the method 500 should be run in before the coordinates of the facial elements are assumed to be known.

FIG. 5 also shows that the method 500 can include placing 506 an approximate grid into the region containing the face. I.e., the facial grid f is assigned some initial value such that $f = f_{initial}$. The initial approximation $f_{initial}$ may contain facial features of an average-looking face. It can be a "mean" grid in the sense that is an average of the coordinates in some number of faces. I.e., the position of the tip of the nose (coordinate 2 in FIG. 2) is averaged over a large number of images so that it is an approximation of the location of the tip of the nose in all images. The initial approximation $f_{initial}$ may account for the coordinates of the region containing the face, taking into account the position, size and the approximate rotation angle of the face.

FIG. 5 further shows that the method 500 can include running 508 an integer chooser $b_k(x,y) \in \mathbb{N}^M$ at each coordinate $f_k$ and concatenating the outputs: $B=(b_0(f_0), \ldots, b_{N-1}(f_{N-1})) \in \mathbb{N}^{N*M}$. The integer chooser $b_k(x,Y) \in \mathbb{N}^M$ yields a vector of M integer numbers at each (x,y) coordinate of an image. It takes into account the pixels of the image. For example, the integer chooser can be based on the multi-level choosing procedure. Other kinds of assigning a vector of integer numbers to an (x,y) coordinate could be also used.

Within the present invention, for each $b_k$ there are M such multi-step choosing procedures, each yielding a number H. Thus, within the present invention $b_k=(H_{k,0}, \ldots, H_{k,M-1})$. Each multi-step choosing procedure includes choose junctions $J_{kij}$, i=[0,M-1], j=[0, $N_{ki}$-1], one of them labeled as the initial. A choose junction contains a set of parameters. It also may contain the "main link" and the "auxiliary link" to other choose junctions. Let us define $C_\gamma(I,x,y)=\mu I(x+x_1,y+y_1)+\lambda I(x+x_2,y+y_2)$, where $\gamma=(x_1,y_1,x_2,y_2,\mu,\lambda,\phi)$—the parameters of a choose junction with $(x_1,y_1),(x_2,y_2)$ being the displacements, I is the image with I(x,y) being the pixel value at (x,y), $\lambda,\mu \in \mathbb{R}$ (which, for example, could take values of 1 or -1). Thus, each choose junction $J_{kij}$ is associated with its parameters $\gamma_{kij}$. To get the output of a multi-level choosing procedure at the coordinates (x,y) of an image, $C_\gamma(I,x,y)$ is repeatedly evaluated starting from the initial choose junction, proceeding to main link if $C_\gamma(I,x,y)<\phi$, and to the auxiliary otherwise, until a choose junction that does not contain any links is reached. Then such choose junction stores an integer number $H_{kij}$ which is the output of a multi-step choosing procedure. For example, if there are $N^*_{ki}$ choose junctions that do not contain any links among $J_{ki}$, one may enumerate them from 0 to $N^*_{ki}-1$, assigning each $H_{kij}$ with a respective number [0; $N^*_{ki}-1$].

FIG. 5 additionally shows that the method 500 can include constructing 510 a vector E. The vector E is of larger dimension than the vector B. For each $B_i$, construct a vector $E_i \in \mathbb{R}^{Q_i}, E_{i,k}=(k==B_i?1:0), k \in [0;Q_i-1]$ where $Q_i$ is a number higher than $B_i$ for any f. Then, the vector E (the "total data") is a concatenation of $E_i$: $E=(E_0, \ldots, E_{N-1}) \in \mathbb{N}^{NM\Sigma Q_i}$.

FIG. 5 moreover shows that the method 500 can include calculating 512 the $(d_x,d_y)$ shifts for the k-th facial element. The $(d_x,d_y)$ shifts are calculated 512 by taking a dot product of E with $D_{S,k}=(D_{S,k}^x,D_{S,k}^y)$ the latter being the "trained data" for the k-th facial element at the current succession number S. Thus, $d_x=<E,D_{S,k}^x>$, $d_y=<E,D_{S,k}^y>$. Optionally add $D^*_{S,k}^x$ to $d_x$ and $D^*_{S,k}^y$ to $d_y$. One of skill in the art will appreciate that the method 500 will always lead to some calculated 512 $(d_x,d_y)$ shifts. One of skill in the art will appreciate that E (which is of rather high dimension) may not actually be calculated, but the dot product can still be calculated 512 directly from B by an efficient procedure:

```
v = 0
offset = 0
for k = 0 to N*M-1 {
```

```
v = v + D_{S,k}[offset + B_k];
offset = offset + Q_i;
}
```

Then v will contain the dot product $<D_{S,k},E>$.

The displacements $(x_1,y_1),(x_2,y_2)$ could undergo a coordinate transformation each time we call a multi-step choosing procedure for some image. Let us have a transformation F(a,b) that transforms (for example, by an affine transform, which may include rotation, scaling, shifting and skewing) a grid b so it became close to a (for example, in the least squares sense, minimizing $\Sigma|a_i-b_i|^2$, or aligning the coordinates of the pupils of a and b instead). For example, the transformation could be represented as $(d_x,d_y,s,\alpha)$ which are shift by the X and Y coordinates, scaling and rotation angle respectively.

Then, for example, if the procedure is called on an image I with a grid $f_k$, we can compute a transformation for the grid $f_k$ to the mean grid, F(Mean, $f_k$), receiving the $(d_x,d_y,s,\alpha)$ representation of the transformation, and then apply this transformation to the displacements before calculating the output of a multi-step choosing procedure.

FIG. 5 also shows that the method 500 can include shifting 514 the X and Y coordinates of $f_k$ by the calculated 512 $(d_x,d_y)$ shifts. I.e., each coordinate in the facial grid f is shifted by the amount in the calculated 512 $(d_x,d_y)$ shifts, bringing the coordinates of $f_k$ closer to the actual value. One of skill in the art will appreciate that the same transformation F(Mean,$f_k$) can be applied to the $(d_x,d_y)$ shift before applying it to $f_k$.

FIG. 5 further shows that the method 500 can include incrementing 516 the succession number S. I.e., the total number of successions has been increased by one. This represents that the method 500 has been run through another iteration.

FIG. 5 additionally shows that the method 500 can include determining 518 if $S<N_s$. That is, it is determined if the method 500 has been run fewer times than required. If $S<N_s$ then the method 500 should be rerun and the method returns to step 506. However, is $S \geq N_s$ then the method 500 has been run a sufficient number of iterations and the method 500 should be halted. One of skill in the art will appreciate that the end of the method 500 can likewise be determined by some determination that the values are within the facial grid are sufficient approximations. For example, if the calculated 512 $(d_x,d_y)$ shifts are below a certain value for every coordinate then the value of the succession number S can be set equal to the total succession number $N_s$ or the method can be halted some other way.

One of skill in the art will appreciate that to get a more precise result, one may run the method 500 several times. In particular, each time the method 500 is run the values within $f_{initial}$ may be displaced by small values (dependent on the size of the facial region), and then the final result can be an average or median of the results for each coordinate of each facial feature.

Figure 6:
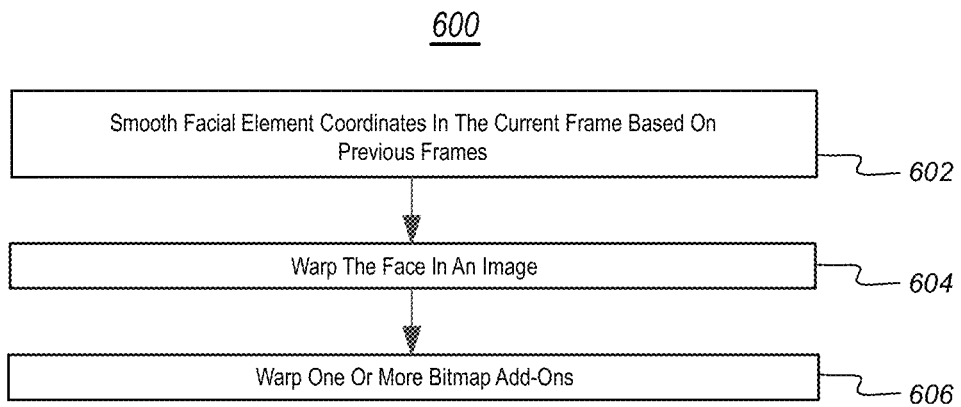

FIG. 6 is a flowchart illustrating a method 600 of synchronizing the bitmap add-on. Synchronizing the bitmap add-on means that the identified face and the bitmap add-on are conformed to one another.

FIG. 6 shows that the method 600 can include smoothing 602 facial element coordinates in the current frame based on previous frames. Usually the detected coordinates of facial elements do not match perfectly the true coordinates of this facial elements because the detection has some error. When detecting facial elements on video, this cause the detected coordinates to oscillate around their true coordinates, which is visually unpleasant. Smoothing 602 these coordinates reduces this oscillation.

There are multiple methods for smoothing 602 which can be used to accomplish the desired result. By way of example, one method is illustrated herein. Assume that there is a sequence of grids $f^t$ in time, $f_k^t \in R^2$, $k \in 0, \ldots, N-1$, $t=T, T-1, \ldots$, with $t=T$ being the latest grid. That is, we store a history of the detections of facial element coordinates at some number of previous frames (one of skill in the art will appreciate that the number may be limited such that the frames being used are only the most recent relevant frames), with the latest frame being the frame to be smoothed. Let's define $C(f) \in \mathbb{R}^2$ that gives the center of a grid, averaging every $f_k$ coordinate, for example $$C(f) = \frac{1}{N} \sum f_k.$$

One may want to exclude the upper eyelid from this averaging, since people usually blink from time to time, which causes the upper eyelid to move, which itself causes the center to go down and up on the blink. One may want additionally exclude the coordinates of the iris, since it also moves. For example, within the given configuration of facial elements, one may exclude the points 28, 35, 36, 32, 39, 40, 23, 26, 37, 38, 27, 31, 41, 42, 0, 1, 29, 30, 33, 34 of FIG. 2 from this averaging.

Then, to smooth 602 the coordinates of the facial elements, the coordinates of the facial center are subtracted from the grid on each frame, and a smoothing filter is applied. For example, a temporal Gaussian filter, or a bilateral Gaussian filter (both spatial and temporal), may be applied. After that, the coordinates of the center of the current frame are added. That is, $S(f^t)=S(f^t-C(f^t))+C(f^T)$, $t=T,T-1,\ldots,T-M$, where M is the amount of previous frames that we store, and S is the smoothing function that works separately at x and y coordinates:

$$S^0(a^t) = \frac{1}{\sum_t \exp\left(-\frac{(a^t-a^T)^2}{\sigma_0^2} - \frac{(t-T)^2}{\sigma_1^2}\right)} \sum_t a^t \exp\left(-\frac{(a^t-a^T)^2}{\sigma_0^2} - \frac{(t-T)^2}{\sigma_1^2}\right)$$

where $\sigma_0$, $\sigma_1$ are the spatial and temporal smoothing coefficients, and $\sigma_0$ could be proportional to some overall face size (for example, its interocular distance).

Alternatively, one may also smooth the center coordinates first, to further reduce the oscillation, so the final result is:

$$S(f^t)=S(f^t-S(C(f)))+S(C(f^T))$$

FIG. 6 also shows that the method 600 can include warping 604 the face in an image. Warping 604 the face in an image ensures that the coordinates detected for a facial element can be properly matched with a bitmap add-on. The warping 604 can be done using any desired method. That is, assuming that we have the coordinates $f_k$ of facial elements in an image (which may have been smoothed by the procedure described above) that need to be warped 604 such that its $f_k$ points are shifted to $g_k$. One may want to warp 604 the source face to achieve certain effects, for example, to enlarge the eyes, mouth, or change the overall facial shape. One may use radial-basis morphing to do this (for example, as we describe in U.S. patent application Ser. No. 13/624,596, previously incorporated, or any other desired method). Alternatively, one may use the following procedure, provided by way of example, to change the image form.

Give the sets of facial element coordinates $f_k$ and its corresponding coordinates $g_k$, $|f|=|g|$, one partitions these points to triangles such that each point is a vertex of some triangle, and no triangle contains points inside it. Usually it is best to do the partition by hand, since it needs to be done only once for a particular configuration of the detected facial elements, choosing the partition to give the most pleasurable effect. Alternatively, one may use automated methods like Delaunay triangulation or a greedy algorithm. As the result of such partition, one gets a set of triads (p,q,r) which define a triangle $(f_p,f_q,f_r)$ or $(g_p,g_q,g_r)$. Then one gets a triangle $(f_p,f_q,f_r)$ and its contents at the source image, and redraws the content of this triangle at the destination image at the coordinates $(q_p,q_q,q_r)$, transforming such content accordingly. There are standard procedures in modern 3D frameworks like OpenGL, OpenGL ES or Direct3D on mobile phones and desktops that allow performing that. Alternatively, one may code this procedure manually from geometric relations between the $(f_p,f_q,f_r)$ and $(g_p,g_q,g_r)$ coordinates, or use any other known method for triangle transformation.

To further improve the aesthetics of the transformation, it may be advised to add more points to $f_k$ and $g_k$. For example, one may add 4 points at the corners of the image and some additional points at the sides. One also may add 4 or more points around the face (with the coordinates of such points based on the size and the position of the face). Further, one may add more points in between facial features, by averaging the coordinates of some points, or shifting some distance at some angle from certain points, where such distance is proportional to the overall face size (for example, its interocular distance, or the distance between the eyes and the mouth), and the angle is related to the angle by which the face is currently rotated. For example one may add more points on the cheeks (by averaging the coordinates of the points 52, 50, 45, 23 in FIG. 2), and on the forehead (stepping up from the coordinates of the eyebrows by the distance proportional to the interocular distance; the direction of the step is at the right angle with the line connecting the eyes).

FIG. 6 further shows that the method 600 can include warping 606 one or more bitmap add-ons. One would want to warp 606 the bitmap add-on to align its facial elements (at the coordinates of $h_k$) with those of the detected (possibly warped) face. So, if we have the coordinates of facial elements of the detected face at $g_k$ (which could be already warped at the previous section), we apply the same warping method to warp the bitmap add-on from $h_k$ to $g_k$, receiving a "warped bitmap add-on".

Figure 7:
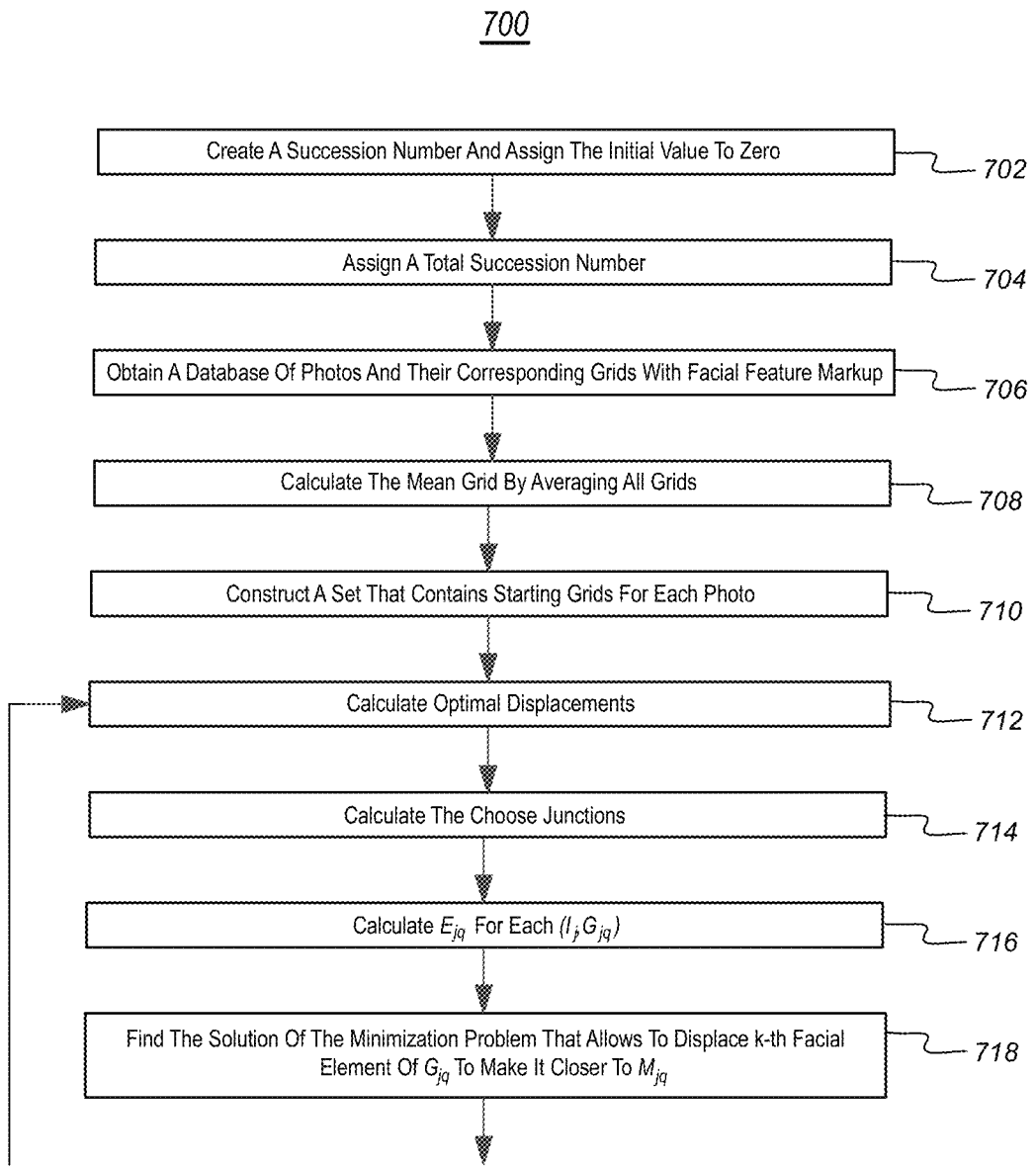
FIG. 7 is a flowchart illustrating a method of training a detector.

FIG. 7 is a flowchart illustrating a method 700 of training a detector. Training the detector allows the synchronization of the bitmap add-on to the identified face to proceed. In particular, one usually needs to obtain a set of choose junctions J and their parameters $\gamma$ for each integer chooser $b_k$ and get the trained data.

FIG. 7 shows that the method 700 can include creating 702 a succession number and assigning the initial value to zero. The succession number is a counter that allows the number of successions that have occurred. I.e., the succession number keeps track of how many times the method 700 has been implemented.

FIG. 7 moreover shows that the method 700 can include assigning 704 a total succession number $N_S$. The total succession umber is the number of times the method 700 should be run in before the coordinates of the facial elements are assumed to be known.

FIG. 7 shows that the method 700 can include obtaining 706 a database of photos $I_j$ and their corresponding grids $g_{jk} \in R^2$, $k \in [0;N-1]$ with facial feature markup. While training, one can augment the database of photos $(I_j,g_{jk})$ by building 3D models from facial images (for example, by using the method in U.S. patent application Ser. No. 13/624, 596, previously incorporated, or any other desired method), rotating them in 3D and changing their emotions, such as opening/closing eyes, applying a smile, frown, changing the mouth expression (like when a phoneme is uttered), possibly relighting, and re-rendering these 3D models. One may additionally augment the database by adding noise to the original photos.

FIG. 7 also shows that the method 700 can include calculating 708 the mean grid Mean by averaging all grids $g_j$. If desired, the mean grid Mean can be enhanced by an iterative procedure. First, the transformation $F(Mean,g_j)$ to each $g_j$: $e_j=F(Mean,g_j)(g_i)$ is applied. Then, Q is calculated by averaging $e_j$. The mean grid Mean is set to the value Q (i.e., Mean=Q) and the steps are repeated two or more times.

FIG. 7 further shows that the method 700 can include constructing 710 a set $G_{jp}$,q-1, . . . ,$N_g$, such that $G_j$ contains $N_g$ "starting grids" for each photo $I_j$. Such starting grids randomly include grids that correspond to other photos, and possibly Mean. If desired, each $S_{jk}$ can be shifted, rotated, and/or rescaled to make it approximately correspond to the face coordinates at $I_j$.

FIG. 7 additionally shows that the method 700 can include calculating 712 "optimal displacements" $M_{jq}=M_{jq}^x,M_{jq}^y)$ that transform $G_{jq}$ to $g_j$. Once $M_{jq}$ has been calculated, the transformation $F(Mean,G_{jq})$ can optionally be applied to its coordinates.

FIG. 7 further shows that the method 700 can include calculating 714 the choose junctions $J_{kij}$. Calculating 714 the set of choose junctions $J_{kij}$, their links and their parameters $\gamma_{kij}$ (with $\gamma=(x_1,y_1,x_2,y_2,\mu,\lambda,\phi)$, as defined above, as the parameters of a choose junction) is done by the following procedure for each facial element k. Let us define a "specimen" as (j,q,k,v) which means that $G_{jqk} \in R^2$ should has the displacement $v=M_{jqk}$. Let us collect a set of specimens $\Omega_k=\{j,q,k,v)|j \in RandomSubset(I);q=1, \ldots ,N_g\}$, where RandomSubset(I) yields a random shuffled subset of the images I, with |RandomSubset(I)|≤|I| (for example, |RandomSubset (I)| could be 0.4*|I|).

A set of possible parameters $\Gamma=\{\gamma\}$ for a choose junction is defined (where $\gamma=(x_1,y_1,x_2,y_2,\mu,\lambda,\phi)$, as defined above, is the parameters of a choose junction). We could choose $\mu,\lambda$ at random, or set them to (−1,1). $\phi$ could be chosen at random from some appropriate interval (for example, [−1;1], if the pixel values of I are in the range [0;1]), or from the even partition of the [−1; 1] range into a number of intervals (for example, 100 intervals). The displacement parameters $(x_1y_1),(x_2,y_2)$ can be chosen, for example, at random from $(-V_{max},V_{max})$ which is an interval of some appropriate size. For example, the interval could be about 0.5 of the interocular distance of the face. We can also decrease this interval as S increases (starting at S=1 or later, for example, at S=3). We can also choose the displacement parameters to be evenly distributed across some particular grid covering the same interval. The number of possible parameters |Γ| could be of the order of 200000, but this number could be more or less than that.

Then, partition the set of specimens Ω into the main and auxiliary subsets by each γ∈Γ:

$$\Omega_{main}(\gamma)=\{(j,q,k,v)|C_\gamma(I_j,G_{jqk})<\phi\}$$

$$\Omega_{auxiliary}(\gamma)=\Omega\setminus\Omega_{main}(\gamma)$$

Compute the value of γ giving the smallest standard deviation σ of v in both sets of specimens (here we denote v(Ω)={v|(j,q,k,v)∈Ω}):

$$\gamma^*=\mathrm{argmin}_\gamma(\sigma v(\Omega_{main})+\sigma v(\Omega_{auxiliary}))$$

This defines the corresponding choose junction having the parameters γ*. If the corresponding sum of standard deviations is sufficient, and the current count of choose junctions is below a certain maximum, then link the choose junction with its main and auxiliary choose junctions, and repeat the described calculation procedure for the main link (with the subset $\Omega_{main}(\gamma^*)$) and for the auxiliary link (with $\Omega_{auxiliary}(\gamma^*)$) until the mentioned condition no longer holds. This finishes the calculation procedure that yields the set of choose junctions $J_{kij}$, their links and their parameters $\gamma_{kij}$ for any given facial element k.

FIG. 7 also shows that the method 700 can include calculating 716 $E_{jq}$ for each $(I_j, G_{jq})$. As described above, the vector $E_{jq}$ is the "total data". Therefore, $E_{jq}$ is calculated as described above.

FIG. 7 moreover shows that the method 700 can include finding 718 the solution of the minimization problem that allows to displace k-th facial element of $G_{jq}$ to make it closer $$M_{jq}: \sum_{j,q} |\langle E_{jq}, D^c_{S,k}\rangle + D^{*c}_{S,k} - M^c_{jq}| \to \min,$$

$$k \in (0; N-1), c \in x, y.$$

The result is $D_{S,k}=(D_{S,k}^x, D_{S,k}^y)$ and $D^*_{S,k}=(D^*_{S,k}{}^x, D^*_{S,k}{}^y)$ which could be (0, 0).

When finding 718 the solution of the minimization problem, the minimization problem could be solved as a linear regression problem or with methods like support vector machines or neural networks. When solving it as a linear regression problem, one may need to add a regularization term λ to the minimized function. Such term could be calculated as $2^z N|E|$, where one could find an optimal value of z by trying different real numbers from some set and stopping at number which gives the best accuracy. Alternatively, one may assign z with a fixed value like 3.6. One may solve the linear regression problem with a gradient descent method or calculate the closed-form solution.

FIG. 7 also shows that the method 700 can include shifting 720 each (k-th) facial element of $G_{jq}$ by $(d_x, d_y)$ calculated as $d_x=\langle E, D_{S,k}^x\rangle+D^*_{S,k}{}^x$, $d_y=\langle E, D_{S,k}^y\rangle+D^*_{S,k}{}^y$. The result for the given succession number is $(J_k, D_{S,k}, D^*_{S,k})$.

FIG. 7 further shows that the method 700 can include incrementing 722 the succession number S. I.e., the total number of successions has been increased by one. This represents that the method 700 has been run through another iteration.

FIG. 7 additionally shows that the method 700 can include determining 724 if $S<N_s$. That is, it is determined if the method 700 has been run fewer times than required. If $S<N_s$ then the method 700 should be rerun and the method returns to step 712. However, is $S\geq N_s$ then the method 700 has been run a sufficient number of iterations and the method 700 should be halted. One of skill in the art will appreciate that the end of the method 700 can halted some other way if desired.

Figure 8:
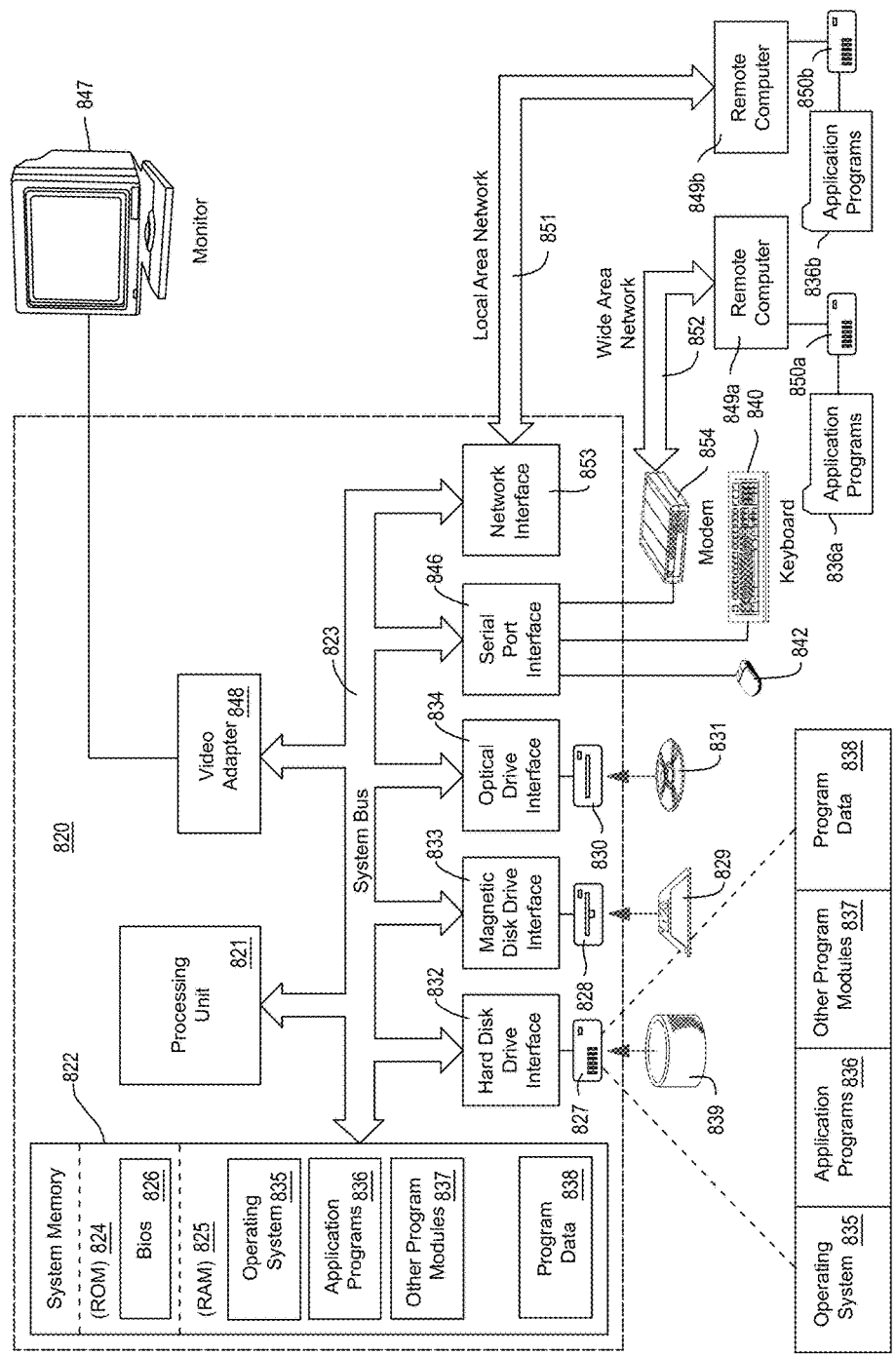
FIG. 8 illustrates an example of a suitable computing environment in which the invention may be implemented.

FIG. 8, and the following discussion, are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an example system for implementing the invention includes a general purpose computing device in the form of a conventional computer 820, including a processing unit 821, a system memory 822, and a system bus 823 that couples various system components including the system memory 822 to the processing unit 821. It should be noted however, that as mobile phones become more sophisticated, mobile phones are beginning to incorporate many of the components illustrated for conventional computer 820. Accordingly, with relatively minor adjustments, mostly with respect to input/output devices, the description of conventional computer 820 applies equally to mobile phones. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, motion detectors or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849*a* and 849*b*. Remote computers 849*a* and 849*b* may each be another personal computer, a server, a router, a network PC, a peer device or other common network node, and typically include many or all of the elements described above relative to the computer 820, although only memory storage devices 850*a* and 850*b* and their associated application programs 836*a* and 836*b* have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 can be connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, the computer system comprising:
   one or more hardware processors;
   system memory coupled to the one or more hardware processors, the system memory storing instructions that are executable by the one or more hardware processors;
   the one or more hardware processors executing the instructions stored in the system memory to apply facial masks to faces in live video, including the following:
   receive an image containing a face from a user, wherein the image is a frame of a video;
   identify the coordinates of a face in the image;
   identify the coordinates of facial elements within the face previously identified using a successive steps method, wherein the successive steps method includes:
      placing an approximate grid into the region containing the face;
      running an integer chooser at each coordinate and concatenating the outputs;
      constructing a vector E;
      calculating the $(d_x,d_y)$ shifts for the k-th facial element; and
      shifting the X and Y coordinates of $f_k$ by the calculated $(d_x,d_y)$ shifts;
   synchronize a bitmap add-on, wherein synchronizing the bitmap add-on includes aligning the bitmap add-on with the identified facial elements; and
   apply the bitmap add-ons over the frame of the identified face.

2. The system of claim 1, the instructions stored in the system memory further comprising:
   applying 3D effects.

3. The system of claim 2, wherein applying 3D effects includes:
   rotating a 3D model to match the rotation of the face.

4. The system of claim 2, wherein applying 3D effects includes:
   animating a 3D model.

5. The system of claim 1, wherein the bitmap add-on includes a character's face.

6. The system of claim 1, the instructions stored in the system memory further comprising:
   repeating the successive steps methods.

7. The system of claim 6, wherein repeating the successive steps method includes:
   repeating until the value of the $(d_x,d_y)$ shifts falls below a predetermined value.

8. The system of claim 6, wherein repeating the successive steps method includes
   creating a succession number and assigning the initial value to zero;
   assigning a total succession number;
   incrementing the succession number each time the successive steps method is run; and
   repeating the successive steps method until the succession number is equal to or greater than the total succession number.

9. The system of claim 1, wherein the approximate grid is a facial grid containing the average coordinates of facial elements as detected in a predetermined number of faces.

10. The system of claim 1, wherein the approximate grid takes into account the position, size and the approximate rotation angle of the predetermined number of faces.

11. The system of claim 1, wherein calculating the $(d_x,d_y)$ shifts for the k-th facial element includes:
   taking a dot product of E with $D_{S,k}=(D_{S,k}^x,D_{S,k}^y)$, where $D_{S,k}=(D_{S,k}^x,D_{S,k}^y)$ is the trained data for the k-th facial element.

12. A computer system, the computer system comprising:
one or more hardware processors;
system memory coupled to the one or more hardware processors, the system memory storing instructions that are executable by the one or more hardware processors;
the one or more hardware processors executing the instructions stored in the system memory to apply facial masks to faces in live video, including the following:
  receive an image containing a face from a user, wherein the image is a frame of a video;
  identify the coordinates of a face in the image;
  identify the coordinates of facial elements within the face previously identified using a successive steps method, wherein the successive steps method includes:
    placing an approximate grid into the region containing the face;
    running an integer chooser at each coordinate and concatenating the outputs;
    constructing a vector E;
    calculating the $(d_x,d_y)$ shifts for the k-th facial element; and
    shifting the X and Y coordinates of $f_k$ by the calculated $(d_x,d_y)$ shifts;
  synchronize a bitmap add-on, wherein synchronizing the bitmap add-on includes aligning the bitmap add-on with the identified facial elements, the method for synchronizing the bitmap add-on including:
    smoothing facial element coordinates in the current frame based on previous frames;
    warping the face in the image; and
    warping the bitmap add-on; and
  apply the bitmap add-ons over the frame of the identified face.

13. The system of claim 12, wherein smoothing facial element coordinates in the current frame based on previous frames includes applying a smoothing filter.

14. The system of claim 13, wherein the smoothing filter includes:
a temporal Gaussian filter.

15. The system of claim 13, wherein the smoothing filter includes:
a bilateral Gaussian filter.

16. A computer system, the computer system comprising:
one or more hardware processors;
system memory coupled to the one or more hardware processors, the system memory storing instructions that are executable by the one or more hardware processors;
the one or more hardware processors executing the instructions stored in the system memory to apply facial masks to faces in live video, including the following:
  receive an image containing a face from a user, wherein the image is a frame of a video;
  identify the coordinates of a face in the image;
  identify the coordinates of facial elements within the face previously identified using a successive steps method, wherein the successive steps method includes:
    placing an approximate grid into the region containing the face;
    running an integer chooser at each coordinate and concatenating the outputs;
    constructing a vector E;
    calculating the $(d_x,d_y)$ shifts for the k-th facial element; and
    shifting the X and Y coordinates of $f_k$ by the calculated $(d_x,d_y)$ shifts;
  train a detector, wherein training a detector allows for synchronization of a bitmap add-on;
  synchronize the bitmap add-on, wherein synchronizing the bitmap add-on includes aligning the bitmap add-on with the identified facial elements, the method for synchronizing the bitmap add-on including:
    smoothing facial element coordinates in the current frame based on previous frames;
    warping the face in the image; and
    warping the bitmap add-on; and
  apply the bitmap add-ons over the frame of the identified face.

17. The system of claim 16, wherein training the detector includes:
obtaining a database of photos and their corresponding grids with facial feature markup;
calculating the mean grid by averaging all obtained grids;
constructing a set that contains starting grids for each photo; and
repeating the steps:
  calculating optimal displacements;
  calculating the choose junctions;
  calculating $E_{jq}$ for each $(I_j,G_{jq})$;
  finding the solution of the minimization problem that allows to displace k-th facial element of $G_{jq}$ to make it closer to $M_{jq}$; and
  shifting each (k-th) facial element of $G_{jq}$ by $(d_x,d_y)$.

18. The system of claim 17, wherein repeating the steps includes:
performing the steps a predetermined number of times.

* * * * *